United States Patent [19]

Weidman

[11] 4,201,904
[45] May 6, 1980

[54] AIR COOLED HEAD FOR STUD WELDING GUN

[75] Inventor: Larry G. Weidman, Prairie Village, Kans.

[73] Assignee: Geo. P. Reintjes Co., Inc., Kansas City, Mich.

[21] Appl. No.: 907,919

[22] Filed: May 22, 1978

[51] Int. Cl.² .............................................. B23K 9/20
[52] U.S. Cl. ....................................... 219/98; 219/99
[58] Field of Search ................. 219/99, 98, 121 P, 78, 219/79, 127, 136

[56] References Cited

U.S. PATENT DOCUMENTS

| 2,727,123 | 12/1955 | Gregory, Jr. | 219/98 |
|---|---|---|---|
| 2,790,066 | 4/1957 | Haynes et al. | 219/98 |
| 3,291,438 | 12/1966 | Logan | 219/99 X |
| 3,309,495 | 3/1967 | Shoup et al. | 219/98 |
| 3,555,238 | 1/1971 | Fay | 219/98 |
| 3,557,339 | 1/1971 | Rondeau | 219/99 |
| 3,582,602 | 6/1971 | Ettinger et al. | 219/98 |
| 3,597,572 | 8/1971 | Ettinger | 219/98 |
| 3,597,573 | 8/1971 | Ettinger | 219/99 |
| 3,662,145 | 5/1972 | Wieland | 219/98 |
| 3,723,700 | 3/1973 | Ettinger | 219/98 |
| 3,790,740 | 2/1974 | Shoup | 219/98 |
| 4,002,876 | 1/1977 | Wieland, Jr. | 219/98 |
| 4,027,136 | 5/1977 | Taylor | 219/98 |

Primary Examiner—B. A. Reynolds
Assistant Examiner—M. Paschall
Attorney, Agent, or Firm—Schmidt, Johnson, Hovey & Williams

[57] ABSTRACT

An improved, relatively permanent operating head for stud welding guns is provided which eliminates the need of ferrule replacement after each welding sequence, thereby greatly speeding up and facilitating the welding operation, and lowering the cost thereof. The head includes an elongated, metallic, notched, dielectric-covered ferrule surrounding the usual stud-conveying chuck provided with the gun, along with air cooling apparatus for directing circumferentially spaced air currents through and exteriorly of the permanent ferrule to extend the life thereof and minimize buildup of slag thereon. In preferred forms, an inner, electrically insulating phenolic sleeve is disposed between the chuck and ferrule, and the work end of the latter is coated with an initial layer of tungsten carbide and an outer layer of tantalum for maximum heat resistance and electrical insulation.

1 Claim, 4 Drawing Figures

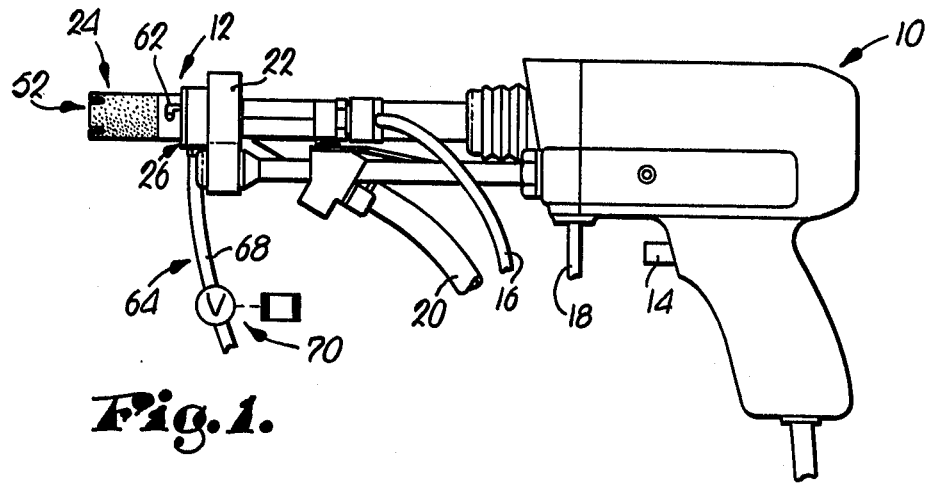
Fig.1.
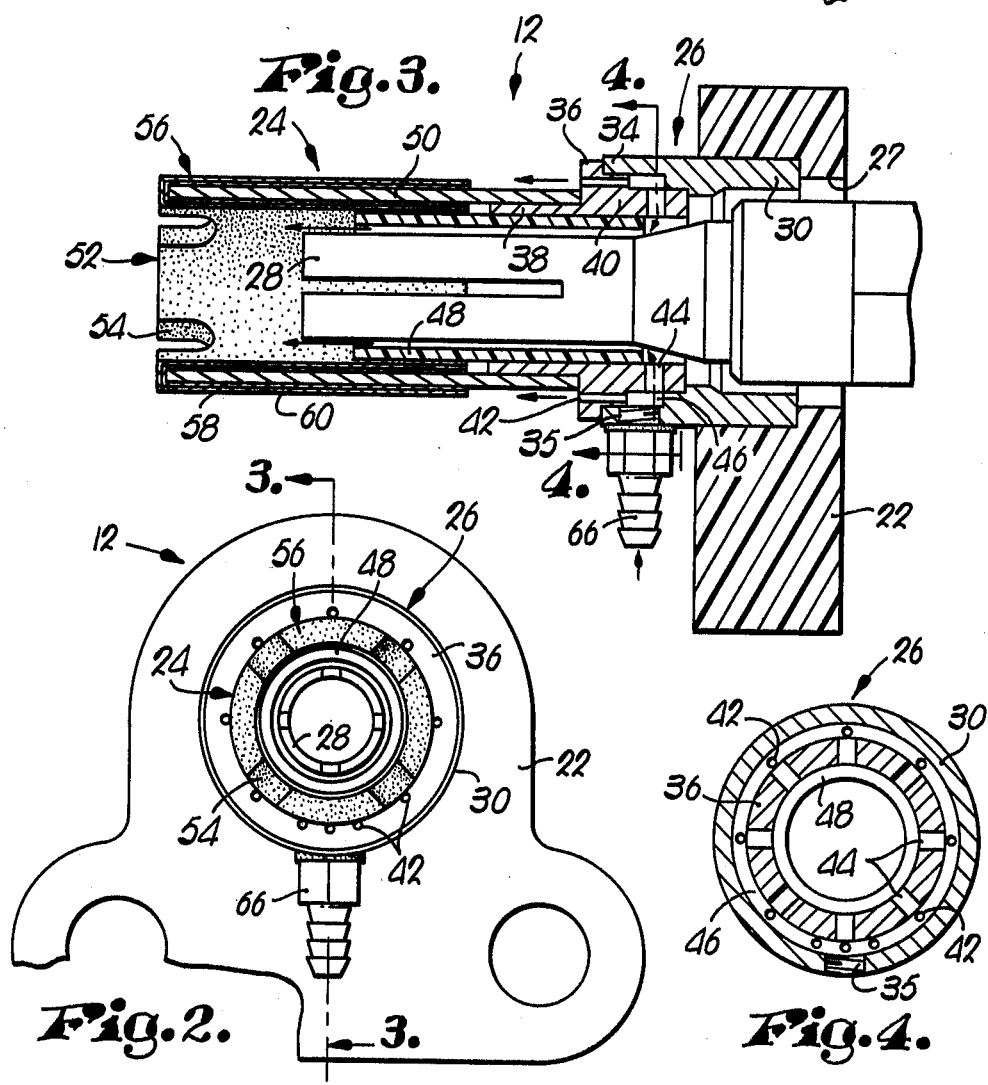
Fig.3.
Fig.2.
Fig.4.

AIR COOLED HEAD FOR STUD WELDING GUN

BACKGROUND OF THE INVENTION

1. Field of the Invention

The present invention relates broadly to stud welding guns used for arc-welding of metallic studs to a work plate. More particularly, it is concerned with an improved, relatively permanent operating head for such guns which include as a feature thereof means for fluid cooling of the head in order to increase the useful life thereof and eliminate the need for ferrule replacement after each welding operation.

2. Description of the Prior Art

A number of stud welding guns have been proposed in the past. These units are used to arc-weld relatively short, cylindrical studs onto a metallic work piece, e.g., a boiler plate. In many prior stud welding guns, a ceramic ferrule is provided which is annular in configuration and engages the work piece and surrounds the end of the stud during the welding sequence. The ferrule serves to confine molten metal to the immediate vicinity of the weld, as an indexing means, and as a safety collar. A persistent problem encountered with such ceramic ferrules is that they can be normally employed for only a single welding sequence. This occurs because the ceramic material of the ferrule can react with the molten metal produced at the weld area, thereby rendering the ferrule unusable. Moreover, the brittle nature of ceramic ferrules renders them prone to cracking during the welding operation. For all of these reasons, the general practice is to simply break away and discard the ceramic ferrule after each operation, followed by replacement with a new ferrule. As can be appreciated, this is an expensive and time consuming task, and therefore a truly permanent operating head for stud welding guns would represent a significant advance in the art.

The following patents are directed to various aspects of known stud welding guns: U.S. Pat. Nos. 3,597,572, 3,555,238, 3,557,339, 3,582,602, 3,790,740, 3,309,495, 3,408,472, 3,662,145, 3,723,700, 4,002,876, and 4,027,136.

Patent No. 3,557,339 relates to a reusable welding ferrule formed of a nonconsumable material such as graphite which has a tapered work end and a series of circumferentially spaced notches. The patent is not concerned with provision of fluid cooling structure for the ferrule in order to increase the life thereof.

U.S. Pat. No. 3,555,238 to Fay et al. describes a permanent arc shield formed of an electrically conductive material such as boron nitrite. A water cooling assembly is disclosed in conjunction with this arc shield which is of relatively bulky nature and would in effect preclude use of this type of operating head in the case where relatively closely spaced studs must be installed or replaced.

U.S. Pat. No. 4,002,876 is directed to a stud welding tool having a specialized retraction mechanism, but discloses a so-called permanent arc shield. Again however, no fluid cooling apparatus is provided with this arc sheild.

U.S. Pat. No. 3,790,740 is concerned with a welding gun using a ceramic ferrule with means for creating a rotary or cyclonic flow of air adjacent the weld area.

The remaining patents listed above are directed to various details of known stud welding guns, and therefore are not directly pertinent to the instant invention.

SUMMARY OF THE INVENTION

The stud gun operating head herein disclosed includes an elongated, relatively permanent ferrule which is disposed about the usual chuck or stud holder provided with stud welding guns. The ferrule is preferably formed of a wear resistant metal such as copper, and has a plurality of circumferentially spaced notches about the work or plate-engaging end thereof for venting purposes. Likewise, the exposed end of the ferrule is coated with a dielectric material in order to prevent arcing between the stud holder and ferrule. Preferably, the dielectric coating involves a two-step process wherein tungsten carbide is first applied, followed by a final coating of tantalum.

An elongated, tubular, electrically insulating phenolic sleeve is preferably disposed between the gun chuck and surrounding ferrule, and a specialized fluid cooling apparatus is provided for cooling the ferrule in order to extend the life thereof, and remove any slag buildup thereon. The fluid cooling apparatus preferably comprises means for directing a plurality of spaced air currents in proximity to the ferrule and along the longitudinal axis of the latter. Advantageously, separate air currents are directed between the ferrule and gun chuck, and exteriorily of the ferrule; this not only provides efficient cooling of the ferrule in order to extend the life thereof, but also assures that there is no significant buildup of welding slag on the work end of the ferrule.

BRIEF DESCRIPTION OF THE DRAWING

FIG. 1 is a partially schematic side elevational view of a conventional stud welding gun having the operating head of the present invention mounted thereon;

FIG. 2 is a fragmentary, enlarged end view of the operating assembly;

FIG. 3 is a vertical sectional view taken along line 3—3 of FIG. 2 which illustrates the internal construction of the operating head; and FIG. 4 is a vertical sectional view taken along line 4—4 of FIG. 3 which illustrates the construction of the air cooling apparatus forming a part of the operating head.

DESCRIPTION OF THE PREFERRED EMBODIMENTS

Referring now to the drawing, FIG. 1 illustrates a known stud welding gun 10 having an operating head 12 in accordance with the invention mounted thereon. In view of the fact that the present invention is concerned only with the operating head 12, a detailed discussion of the structure and operation of gun 10 is unnecessary. However, it will be understood that the gun 10 is of pistol-like configuration and includes an operating trigger 14, respective air lines 16 and 18, a stud supply line 20, and a head mounting foot 22. The illustrated stud welding gun is sold by the Nelson Division of TRW, Inc. of Cleveland, Ohio, under the designation "Model NS-200"; it will be understood however, that the operating head assembly 12 can be used in conjunction with a wide assortment of conventional stud welding guns, and that the depicted gun has been selected for purposes of illustration only.

Operating head 12 broadly includes an elongated, tubular ferrule 24 of substantially constant diameter, along with fluid cooling apparatus generally referred to by the numeral 26 for cooling ferrule 24 and preventing slag buildup thereon. As best seen in FIG. 3, the head 12 is mounted into a recessed opening 27 provided in foot 22, and ferrule 24 is in surrounding, radially spaced relationship to the stud delivery end of tubular stud holder or chuck 28 provided with gun 10. Chuck 28 extends through the opening 27 of foot 22 in the usual fashion.

In greater detail, assembly 26 includes a generally annular bushing 30 which is located and press fitted within the recess adjacent opening 27 in foot 22. Bushing 30 has a substantially uninterrupted cylindrical outer surface. The inner surface of bushing 30 is somewhat irregularly shaped in order to accommodate the shape of stud holder 28 and the associated gun mechanism. An annular projection 34 at the end of bushing 30 remote from foot 22 is provided as illustrated which is provided with a radial, nipple-receiving aperture 35 therethrough. Assembly 26 also includes a generally annular insert 36 which includes a relatively thin annular projection 38 and an annular, somewhat thickner, main body portion 40. Body portion 40 is provided with two sets of passages 42 and 44. Each set of passages is circularly arranged and circumferentially spaced as best seen in FIG. 4. The passages 42 are generally parallel with the longitudinal axis of the insert 36, while the passages 44 are perpendicular with respect to this axis. It will also be noted that, with respect to the passages 42, three closely arranged passages are provided adjacent the normal underside or bottom of the insert 36.

Insert 36 is secured within bushing 30 (see FIG. 3) in a manner to define an annular plenum 46 between the inner surface of projection 34 and the outer surface of main body portion 40. From the foregoing it will be readily seen that plenum 46 is located to afford continuous communication between the aperture 35 and the respective sets of passages 42 and 44.

An elongated, tubular, electrically insulative phenolic sleeve 48 is secured to the inner face of insert 36 (without blockage of the passages 44) and presents a dielectric barrier between the metallic components of the assembly 26 and stud holder 28. As shown in FIG. 3, the sleeve 48 is concentrically disposed relative to the holder 28, and is in constant, radially spaced relationship therefrom.

Ferrule 24 includes a tubular main body 50 of wear resistant metal such as copper. The work end 52 of ferrule 24, i.e., that which engages the work piece, is provided with a series of circumferentially spaced notches 54 which provide venting communication between the interior and exterior of the ferrule. The work end 52 of body 50 is coated with a dielectric material 56 in order to insulate body 50 from holder 28. Any one of a number of conventional coatings can be used for this purpose; however, it has been found to be particularly advantageous to provide an initial coating 58 of tungsten carbide and a secondary or outermost coating 60 of tantalum. The inner coating is preferably about ten thousandths of an inch in thickness and is applied by flash coating techniques. The outer coating is normally applied to give a thickness of from about ten to fifteen thousandths of an inch. This combination has proven to be particularly effective in making the overall ferrule 24 both resistant to heat and wear, and also effectively insulated. In the embodiment illustrated, it will be noted that the dielectric coating is not applied over the entirety of the body 50, but only over the forward or work end thereof. This presents no problems however, for upon installation of the ferrule, the uncoated end thereof is protected by virtue of the dielectric sleeve 48.

Ferrule 24 is preferably releasably secured to the projection 38 of insert 34 by means of a bayonet latch 62 provided for this purpose. That is to say, projection 38 is provided with a radially outwardly extending pin, while the inner end of body 50 has a bayonet opening of the usual construction.

Means generally referred to by the numeral 64 is provided for supplying pressurized air to the assembly 26. The air supply means includes a nipple 66 secured within the aperture 35, and an air line 68 coupled to the nipple. A solenoid controlled valve 70 is interposed within line 68 and is operated by means of conventional control circuitry in the manner explained below.

The operation of gun 10 proceeds substantially as normal, in that once trigger 14 is pulled a metallic stud from line 20 is shifted into the stud-receiving chuck, and an arc is thereafter drawn between the stud and work piece. This serves to melt the work piece at the vicinity of the intended weld, as well as the adjacent end of the stud. A timer associated with the gun then shuts off the arc-inducing current, and the stud is plunged into the molten metal created by the arc in order to create the weld. In the present invention however, improved results are obtained using operating head 12. Specifically, pressurized air through line 68 is continuously directed through nipple 66, opening 35, plenum 46, and finally the passages 42, 44. This effectively cools the ferrule after the welding operation, and the passages 42 (particularly the closely spaced passages at the normal underside of the head) serve to strip away any slag buildup on the ferrule. Airflow in this manner is continued except for the periods of time when the welding sequence occurs. This on-off action is controlled by solenoid valve 70, and in preferred forms a timer is coupled to the valve 70 so that airflow is resumed only after about one second after the stud is plunged into the molten metal. In this connection, it has been found that airflow during the welding sequence is deleterious in that the resultant weld loses its strenght; therefore, it is preferable to time the airflow through the passages 42, 44 for continuous flow save for the times when the welding sequence is performed and for a short period thereafter. The circuitry associated with solenoid valve 70 (not shown) is conventional, and is operatively coupled with the control circuitry for the gun 10.

In practice the operating head 12 of the present invention has proven to have an extremely long life and to greatly facilitate stud welding operations. In particular, with the use of head 12, there is no need for laborious removal and replacement of ferrules as is common in the prior art, since the head assembly is relatively permanent and usable for many thousands of welds.

I claim:
1. The invention comprising:
   a high amperage electric arc stud welding gun having a tubular stud holder;
   an elongated, tubular, metallic relatively permanent ferrule of substantially constant diameter operatively coupled to said gun, one end portion of the ferrule circumscribing the stud holder in radially spaced relationship therefrom, the other, work end portion of the ferrule extending outwardly from the stud holder for engagement with a workpiece, the area of engagement by the operating head with the workpiece being limited to the diameter of said work end portion of the ferrule, and the surrounding said work end being unconfined, whereby studs may be welded on the workpiece in closely spaced relationship, limited only by said diameter of the work end portion of the ferrule;

a tubular insulating sleeve disposed between said one end portion of the ferrule and the stud holder, the sleeve being spaced from the stud holder whereby to define an annular fluid passageway of substantially constant, relatively small cross-sectional dimension between the sleeve and the stud holder to permit delivery of cooling fluid to the interior of the ferrule;

means for delivery of cooling fluid under pressure unidirectionally from said one end portion to said work end portion and generally along the length of said ferrule and proximal both faces of the circular sidewall thereof for cooling of the ferrule and stripping of slag therefrom, including an annular insert having a body portion circumscribing said sleeve, the insert having a first and second set of passages, said first set of passages being in fluid communication with the relatively small passageway between the sleeve and the stud holder, said second set of passages circumscribing the ferrule in closely spaced relationship thereto for deliverying cooling fluid along the exterior thereof; and means for delivering cooling fluid under pressure to said insert and said first and second passages, said air being under sufficient pressure for cooling said ferrule and thereby extend the life thereof, and for stripping slag from said ferrule.

* * * * *